United States Patent [19]

Kalil et al.

[11] Patent Number: 4,556,327
[45] Date of Patent: Dec. 3, 1985

[54] TEMPERATURE AVERAGING THERMAL PROBE

[75] Inventors: Lou F. Kalil, College Park, 86301; Victor Reinhardt, Gaithersburg, both of Md.

[73] Assignee: The United States of America as represented by the Administrator of the National Aeronautics and Space Administration, Washington, D.C.

[21] Appl. No.: 462,508

[22] Filed: Jan. 31, 1983

[51] Int. Cl.[4] .............................................. G01N 25/68
[52] U.S. Cl. .................................... 374/115; 374/120; 374/163
[58] Field of Search ................ 374/116, 115, 185, 183, 374/162, 165, 208, 206, 207, 210, 12, 11, 110, 111, 112, 134, 135, 113, 120, 121, 137, 163, 209; 338/25; 136/232, 233

[56] References Cited

U.S. PATENT DOCUMENTS

| | | | |
|---|---|---|---|
| 2,694,930 | 11/1954 | Lamb et al. | 73/362 |
| 2,973,495 | 2/1961 | Greenberg | 374/110 |
| 2,986,034 | 5/1961 | Jones | 374/121 |
| 3,267,733 | 8/1966 | Chambers | 338/25 |
| 3,429,183 | 2/1969 | Lindberg | 73/362 |
| 3,693,011 | 9/1972 | De Vaux et al. | 374/121 |
| 3,923,552 | 12/1975 | Parris | 374/135 |
| 3,935,032 | 1/1976 | Brandeberry et al. | 374/135 |
| 3,960,604 | 6/1976 | Heitzinger et al. | 136/232 |
| 4,001,586 | 1/1977 | Fraioli | 374/121 |
| 4,242,906 | 1/1981 | Briscoe et al. | 136/232 |
| 4,297,851 | 11/1981 | Paddock et al. | 62/126 |
| 4,352,290 | 10/1982 | Neils | 374/110 |
| 4,401,104 | 8/1983 | Kuzdrall | 374/121 |

Primary Examiner—Charles Frankfort
Assistant Examiner—David R. Schuster
Attorney, Agent, or Firm—John O. Tresansky; John R. Manning; Sol Sheinbein

[57] ABSTRACT

A thermal probe (10) for averaging temperature fluctuations over a prolonged period is formed with a temperature sensor (22) embedded inside a solid object (12) of a thermally conducting material. The solid object is held in a position equidistantly spaced apart from the interior surfaces of a closed housing (16) by a mount (14) made of a thermally insulating material. The housing is sealed to trap a vacuum or mass of air inside and thereby prevent transfer of heat directly between the environment outside of the housing and the solid object. Electrical leads (24) couple the temperature sensor with a connector (26) on the outside of the housing. Other solid objects of different sizes and materials may be substituted for the cylindrically-shaped object to vary the time constant of the probe.

7 Claims, 1 Drawing Figure

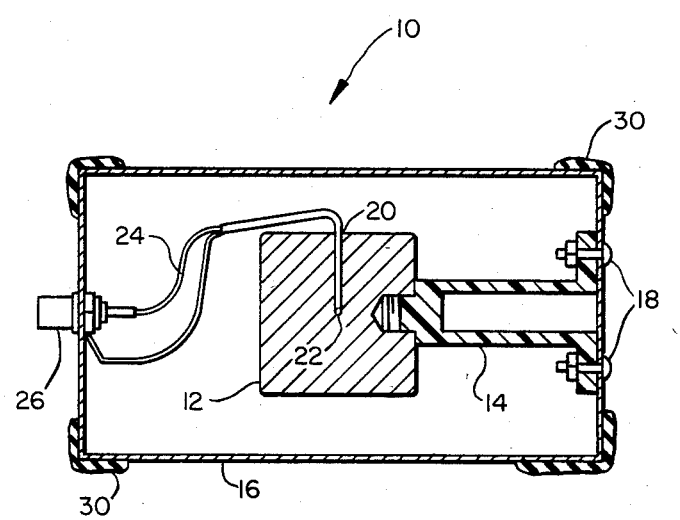

TEMPERATURE AVERAGING THERMAL PROBE

ORIGIN OF THE INVENTION

The invention described herein was made by an employee of the U.S. Government and may be manufactured and used by or for governmental purposes without the payment of any royalties thereon or therefor.

TECHNICAL FIELD

This invention relates to temperature sensors and, more particularly, to a probe for averaging the temperature of a fluid over a period of time.

BACKGROUND ART

Devices for sensing an average temperature of a fluid within a container, particularly those relying upon electrical bridge networks to integrate several simultaneous signals, are well known in the instrumentation art. Such devices are usually constructed with one or more electrical temperature sensors located in the container and directly exposed to the fluid. In one such device, the temperature sensor is mounted within a refrigerator cabinet and directly exposed by vent openings to refrigerated air circulating within the cabinet. In another device, several temperature sensitive resistance coils of different lengths are vertically positioned within an oil tank and selectively connected to a bridge circuit to provide a measurement indicative of the average oil temperature over the depth of the tank. In effect, these devices measure the instantaneous average temperature over the volume of fluid and not the average temperature of the fluid over a period of time. Temperature measurements provided by these devices vary instantaneously with changes in the temperature of the fluid because of the direct exposure of the sensor to the fluid. The measurements, therefore, respond to short-term fluctuations in temperature due to convection, fluid circulation, loss of heat due to radiation, and cyclical operation of the container's cooling or heating plant, as well as to longer term changes in temperature due to factors such as diurnal absorption of ambient heat.

Occasionally, it becomes necessary to measure the period and amplitude of only the longer term fluctuations in the temperature of a large fluid mass for such purposes as gauging the performance of a process exposed to the mass, for calibration of a temperature sensitive apparatus, or for estimating future cooling and heating needs. Longer term fluctuations may have an amplitude of only one or two degrees over a period of one or more hours while short-term fluctuations usually have periods of less than five minutes. To measure the period and amplitude of the longer term fluctuations, therefore, it is necessary to suppress the effects of cyclical and short-term fluctuations in temperature by continuously averaging those fluctuations over the longer period. The instantaneous responsivity of prior art devices to short-term fluctuations renders them unsuitable for making these measurements, particularly if the fluid is sometimes in motion and at other times still. Moreover, without prior knowledge of the period and amplitude of the longer term fluctuations, periodic sampling of a fluid temperature is an unsuitable alternative method of making these measurements because it is likely to yield misleading data, particularly if the periods and amplitudes of the short-term fluctuations are also unknown. Another alternative, continuous sampling, is also unsatisfactory because it will yield an unnecessary profusion of data while tying-up expensive instrumentation.

STATEMENT OF INVENTION

Accordingly, it is one object of this invention to provide a device for sensing the average temperature of a mass of fluid over a period of time.

It is another object to provide a device that is insensitive to short-term temperature fluctuations for sensing the average temperature of a mass of fluid over a prolonged period of time.

It is still another object to provide a probe that may be easily modified to sense the average temperature of a mass of fluid over different periods of time.

It is yet another object to provide a temperature probe exhibiting a time constant which remains substantially invariable when in contact with fluids of varying velocities.

These and other objects are achieved by a thermal probe for averaging the temperature of a fluid over a prolonged period of time. The probe has a temperature sensor embedded within a thermally conducting mass. The conducting mass is held inside a housing by a thermally insulating mount, in spaced separation from the walls of the housing. The housing is closed to trap air inside which serves as an insulating space between the housing's walls and the conducting mass to prevent direct transfer of heat between the air surrounding the housing and the conducting mass.

BRIEF DESCRIPTION OF THE DRAWING

A more complete appreciation of this invention and, many of the attendant advantages thereof, will be readily apparent as the same becomes better understood by reference to the following detailed description when considered in conjunction with the accompanying Figure illustrating a cross-sectional side view of a temperature averaging thermal probe.

DETAILED DESCRIPTION OF THE INVENTION

Refer now to the Figure which illustrates a temperature averaging thermal probe 10 according to this invention. The probe has a solid object, such as a cylinder 12 formed of a high-thermal conductivity material such as aluminum, attached to a threaded distal end of an elongate mount 14. The mount is made of a thermally insulating material (e.g., Delrin 500) and is attachd to an inside wall of a housing 16 by fasteners such as nuts and bolts, 18 so that its distal end protrudes toward the center of the chamber formed by the housing.

Housing 16 is a thin-walled, closed container made of a thermally conducting material such as aluminum. The housing and the solid object may be made of the same or of different thermally conducting materials. The size and shape of housing 16 is chosen to assure that its inside surfaces do not touch cylinder 12. Preferably, cylinder 12 has a symmetrical shape along one or more axes and is held in a symmetric position relative to the interior of housing 16 to provide an equidistant spacing between its exterior surfaces and opposite walls of the housing. Such as equidistant spacing is better provided if the solid object has an exterior shape that conforms to the interior shape of the housing.

A blind hole 20 extends from one surface to the center of the cylinder 12 and an electro-responsive or other suitable temperature sensor 22 (e.g., a ten kilo-ohm Fenwal unicurve thermister) is embedded inside the hole at the center of the cylinder to provide an electrical response to heat detected there. Electrically insulated leads 24 couple sensor 22 to an electrical connector 26 which passes through another wall of housing 16. A commercially available recording instrument may be coupled to connecter 26. The hole may be filled with a thermally conducting material to increase the transfer of heat between the sensor and the thermal solid object.

The housing 16 of probe 10 should be constructed as a closed container to trap a fluid inside and prevent a transfer of heat by direct communication between a fluid on the outside of the housing and the solid object. To prevent such communication, the housing may be made as a sealed, unitary container or as a container having a tightly fitting cover. Alternatively, the probe, before used, should be sealed by covering all cracks and interstices with glue or tape 30. When the probe 10 is used to sense temperature fluctuations in a fluid, as for example, atmospheric air within a room of a building, the entire exterior surface of the housing 16 is exposed to the atmospheric air and heat will be transferred across the thin-walled housing from the atmospheric air to the solid object via the fluid (e.g., a body of trapped atmospheric air) inside the housing.

The probe may be analytically described by a thermal equivalent circuit in which temperature is the equivalent of voltage and heat transfer rate is the equivalent of voltage. In this circuit, the thermal resistance to heat flow between the fluid and housing is given by:

$$R_h^{-1} \simeq f(v) \cdot A_h \quad (1)$$

where f(v) is a function of the velocity, v, of the fluid surrounding the housing and $A_h$ is the surface area of the housing. The value of f(v) is approximately unity when the fluid is at rest. The thermal resistance to heat flow between the housing and the solid object is given by:

$$R_a^{-1} \simeq A_m \quad (2)$$

where $A_m$ is the surface area of the conducting mass. When the value of $A_h$ is approximately ten times or more larger than $A_m$, $R_a$ will be smaller than $R_h$ by a factor of ten or more. Under this condition, the temperature of the housing will approximately equal the temperature of the fluid surrounding the housing while the temperature of the solid object will lag behind the temperature of the fluid by an inverse exponential time constant approximately equal to the product of $R_a$ and the mass of the solid object.

To assure that $R_a$ has a large, constant value that will be substantially independent of the velocity of the fluid surrounding the housing, the housing must be sealed to prevent convective heat transferby leaks between the fluids inside and outside of the housing.

The separation between the housing and the solid object, typically filled by still air, provides a limiting thermal resistance which, together with the mass of the solid object, determines the thermal time constant of the probe independently of the velocity of fluid contacting the exterior of the housing. The exterior surface area of the housing is therefore made sufficiently large in comparison to $A_m$ so that the thermal resistance $R_a$ determines the thermal time constant of the probe even when the fluid contacting the probe's exterior is at rest.

The value of the probe's time constant can be tailored to different applications by changing either or both the mass of the solid object while maintaining the relation:

$$R_a >> R_h. \quad (3)$$

Empirical calibrations yield the exact values of the time constant for different values of $R_a$ and solid object masses. The principles of this probe do not change if the fluid inside the housing is replaced with a vacuum. The value of $R_a$ will be significantly greater for a vacuum, however, because heat transfer between the housing and the solid object will be limited primarily to radiative transfer. Moreover, the use of a vacuum will allow a probe to be made with a smaller housing and solid object.

It is apparent from the foregoing that probe 10 may be used to sense long term temperature fluctuations in fluids other than air. In whatever environment used, the presence of the solid object surrounded by a mass of air or other fluid trapped inside the housing shields the temperature sensor from the effects of short-term environmental temperature fluctuations. Sealing the housing enhances the stability of the probe by eliminating direct heat transfer between the outside air and the cylinder, thereby assuring minimal deviation in the time constant of a probe when the outside air is alternately stationary and circulating. When the solid object is held by its mount in a symmetric position relative to the inside of the housing, heat transferred between the housing and the object will be more uniformly distributed over the exterior of the cylinder, thereby assuring that the probe will provide a consistent response regardless of its orientation in a particular environment.

We claim:

1. A temperature averaging thermal probe for sensing the amplitude of long-term temperature fluctuations; comprising:
   a closed housing (16) of a thermally conducting material;
   a solid object (12) of a thermally conducting material positioned within said housing;
   said housing being sealed to trap a mass of air therein and thereby preventing the transfer of heat directly between the environment outside of the housing and the solid object;
   means (14) made of a thermally insulating material extending from an inside surface of said housing for holding said solid object inside and equidistantly spaced apart from all opposite interior surfaces of said housing thus assuring that no direct communication exists between the interior surfaces of the housing and the solid object;
   means (22) embedded within said solid object for sensing heat; and
   means (24, 26) for transferring a signal between said sensing means and the exterior of said housing.

2. The probe of claim 1 wherein said housing has a construction preventing a direct communication between a fluid outside said housing and said solid object.

3. The probe of claim 2 wherein said housing maintains a vacuum within the interior of said housing.

4. The probe of claim 2 further comprising a fluid filling the interior of said housing.

5. The probe of claim 2 wherein the exterior of said solid object and said interior of said housing have conforming configurations.

6. The probe of claim 5 wherein the thermal resistance to heat flow of said housing is substantially smaller in value than the thermal resistance to heat flow between said housing and said solid object.

7. The probe of claim 6 wherein said thermal resistance to heat flow between said housing and said solid object exceeds the value of said thermal resistance to heat flow of said housing by at least a factor of ten.

* * * * *